United States Patent [19]

Berger

[11] Patent Number: 4,690,588
[45] Date of Patent: Sep. 1, 1987

[54] SEAWALL

[75] Inventor: Lawrence E. Berger, Sterling Heights, Mich.

[73] Assignee: C-Lock Retention Systems, Inc., Utica, Mich.

[21] Appl. No.: 873,443

[22] Filed: Jun. 5, 1986

Related U.S. Application Data

[63] Continuation of Ser. No. 607,313, May 4, 1984.

[51] Int. Cl.[4] .......................................... E02D 29/02
[52] U.S. Cl. .................................. 405/262; 405/274; 405/278; 405/284
[58] Field of Search ............... 405/262, 258, 284–287, 405/272–283, 16–20, 114

[56] References Cited

U.S. PATENT DOCUMENTS

| | | | |
|---|---|---|---|
| 250,635 | 12/1881 | McLean | 405/284 X |
| 398,080 | 2/1889 | Rearden | 405/273 X |
| 627,375 | 6/1899 | Zanetti | 405/16 |
| 904,030 | 11/1908 | Walther | 405/275 |
| 972,059 | 10/1910 | Clarke | 405/114 |
| 975,665 | 11/1910 | Wemlinger | 405/284 |
| 1,084,597 | 1/1914 | Anft | |
| 1,332,655 | 3/1920 | Willard | 405/16 |
| 1,371,709 | 3/1921 | Stockfleth | 405/275 X |
| 1,422,821 | 7/1922 | Boardman | 405/284 |
| 1,896,989 | 2/1933 | Walker | 405/16 |
| 1,902,397 | 3/1933 | Doyle | 405/274 |
| 1,947,151 | 2/1934 | Caples | 405/262 |
| 1,965,169 | 7/1934 | Becker | 405/279 X |
| 2,018,920 | 10/1935 | Mette | 405/284 |
| 2,318,349 | 5/1943 | Wiley | 405/15 |
| 2,968,931 | 1/1961 | McGrath | 29/281.6 |
| 3,008,581 | 11/1961 | Kohler | |
| 3,229,468 | 1/1966 | Schneller | 405/285 |
| 3,247,673 | 4/1966 | Schneller | 405/284 |
| 3,347,048 | 10/1967 | Brown et al. | 405/16 |
| 3,420,065 | 1/1969 | Holl | 405/284 |
| 3,541,798 | 11/1970 | Schnabel | 405/262 |
| 3,548,603 | 12/1970 | Spinna et al. | 405/284 |
| 3,739,588 | 6/1973 | Schroter et al. | 405/262 |
| 3,802,204 | 4/1974 | Mason | 405/262 |
| 3,822,557 | 7/1974 | Frederick | 405/278 X |
| 4,041,670 | 8/1977 | Kaplan | 52/594 |
| 4,099,359 | 7/1978 | Sivachenko | 405/126 |
| 4,369,004 | 1/1983 | Weatherby | 405/262 |
| 4,407,611 | 10/1983 | Murray et al. | 405/284 |
| 4,407,612 | 10/1983 | van Weele | 405/285 |
| 4,480,945 | 11/1984 | Schnabel | 405/262 |

FOREIGN PATENT DOCUMENTS 1808208  9/1968  Fed. Rep. of Germany .

Primary Examiner—Dennis L. Taylor
Attorney, Agent, or Firm—Cullen, Sloman, Cantor, Grauer, Scott & Rutherford

[57] ABSTRACT

The seawall extends along and retainingly engages the ground and at its top extends above the ground level and at its bottom is projected and anchored down into the ground, below the water level. The seawall includes a series of laterally aligned elongated corrugated bulkhead strips made from a plastic material. Each strip has along one side an undercut grooves edge and along its other side a similarly shaped tongue edge, with the tongue and groove edges of adjacent bulkhead strips interlocked. The strips are of such lightweight that each strip may be lifted and assembled manually relative to an adjacent anchored strip and driven into the ground and into lateral alignment with an adjacent strip and a longitudinal interlock. A cap overlies and is secured upon a bulkhead strip. Spaced anchor strips are embedded into the ground and spaced from the seawall and connected to corresponding bulkhead strips by a series of tie rods and flexible walers.

29 Claims, 16 Drawing Figures

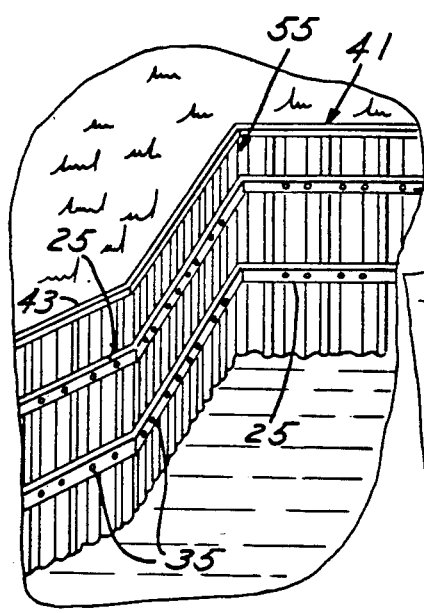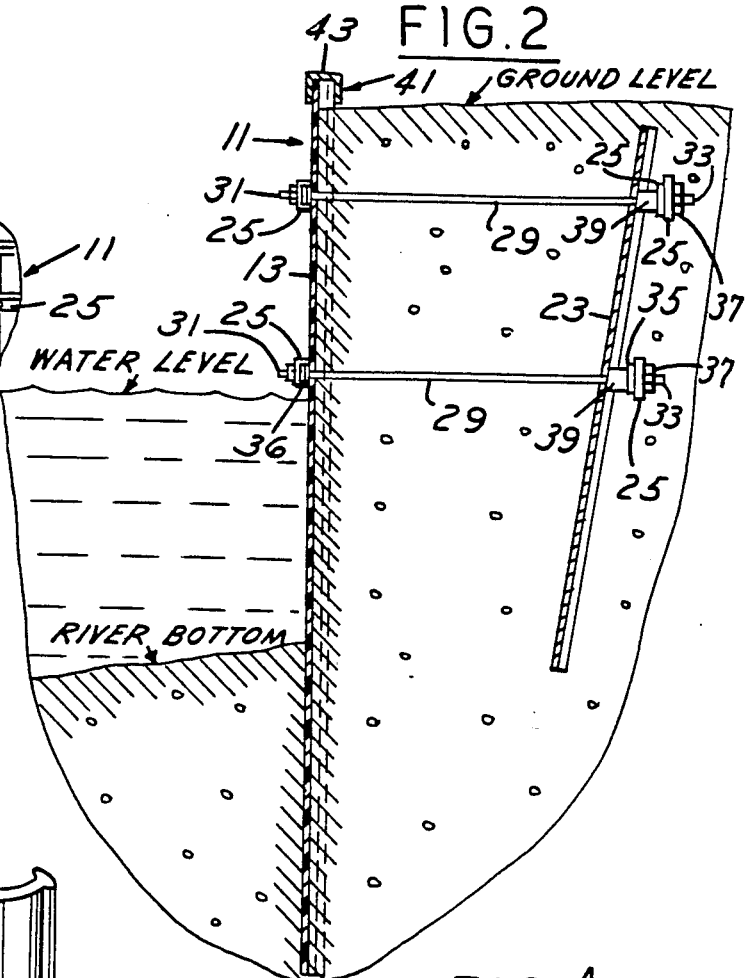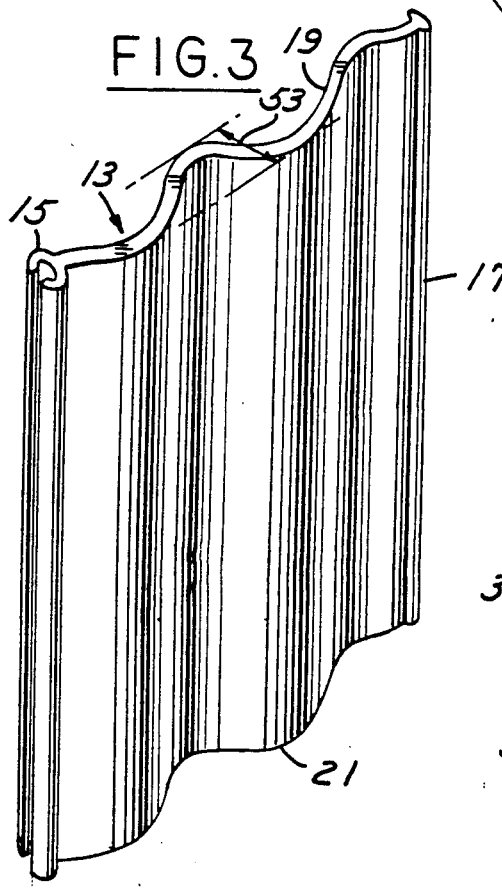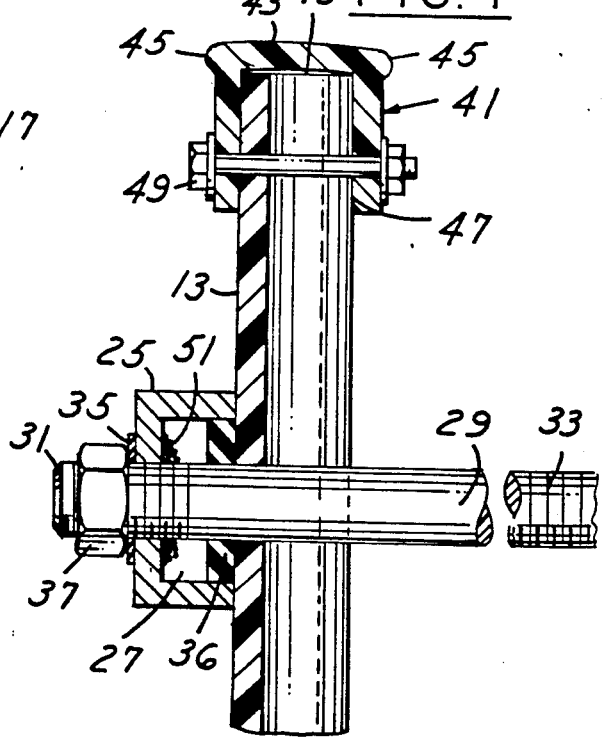

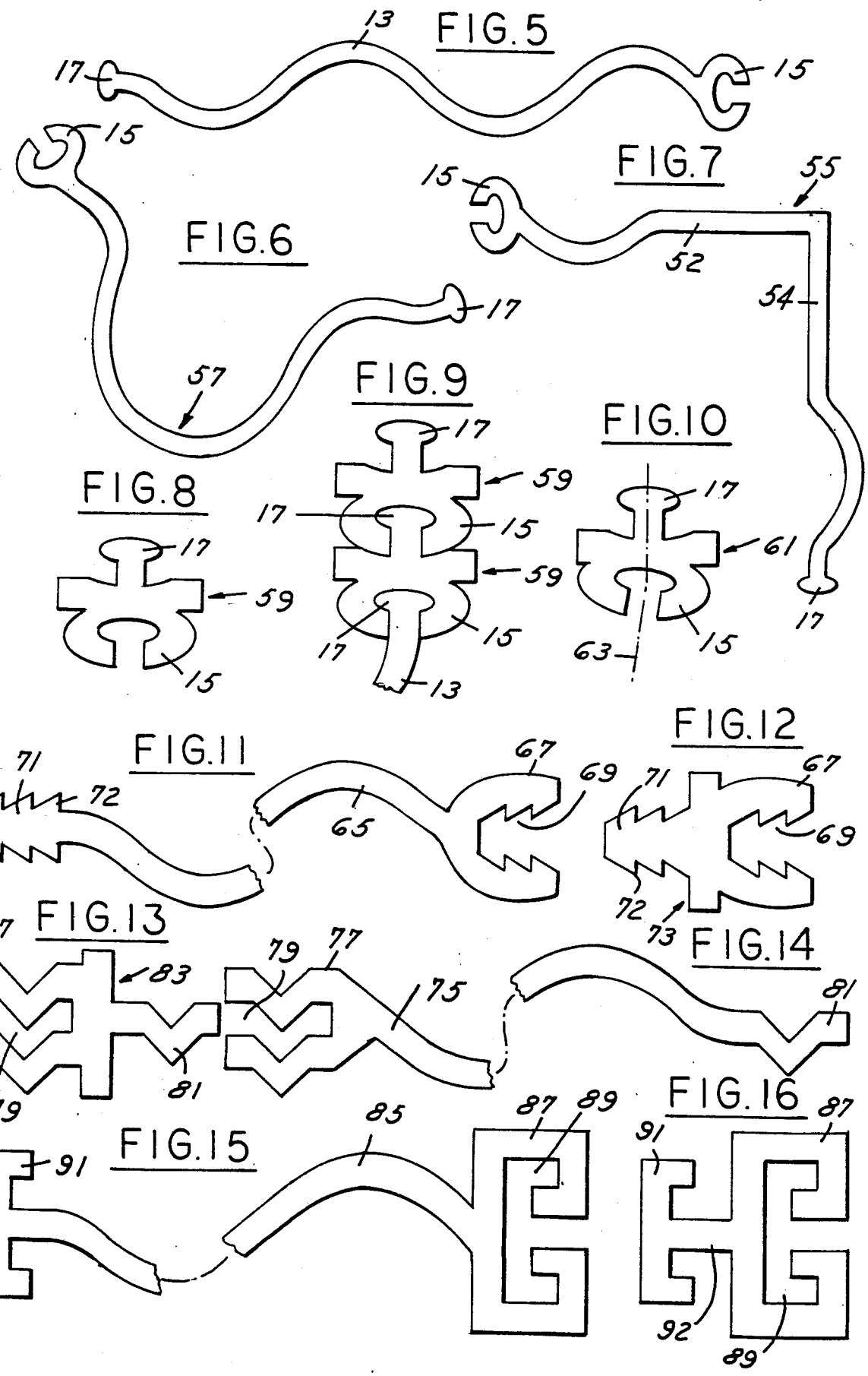

SEAWALL

This application is a continuation of my U.S. patent application, Ser. No. 607,313, filed May 1984.

BACKGROUND OF THE INVENTION

The present invention relates to a seawall for a body of water, extends along, and retainingly and protectively bears against a bounding shore with the seawall at its top, extending above the ground level and at its bottom, retainingly projected and anchored down into the ground, below the water bottom.

Heretofore seawalls have been constructed of steel, cement and wood. The steel and cement systems have long life and are expensive. Both require expensive heavy equipment for installation, and limited numbers of companies have such equipment for installation. The wood system for shore protection can be handled by the property owner or can be sub-contracted to people with specialized equipment. Wood systems as installed today are by those with limited budgets. The life expectancy of wood is about one-half that of steel and repairs are usually made in a haphazard manner until replacement is necessary. Often, replacement of existing wood systems includes the use of steel. Specialized heavy equipment is available for installing a new steel seawall and at the same time remove the old wood seawall.

Normal installation at existing water edges includes shallow water. Usually three feet of dredging is allowed at the front of the seawall. Government policies are very rigid about going into waterways resulting in majority of bulkheads being assembled in shallow water. Steel bulkheads must be installed with heavy construction equipment. Some installations are constructed off of large barges. Some heavy duty equipment is used in residential yard area. This use of heavy equipment places the installation of bulkheads in the hands of a few specialized installers with a large overhead and heavy equipment. This offers potential damage to septic fields with equipment operated over the fields. In some cases, equipment large enough to install bulkheads of steel or wood have not reached the site because of bridges on canals or adjoining properties being too close to allow passage of equipment. This results in small equipment being used for the improper installation of such bulkheads.

The appearance of steel is not always acceptable and painting is a problem. Steel bulkheads should be painted during low water which occurs during cold winter months. Normally it is too cold to paint. Cement bulkheads, similar to steel bulkheads, are expensive and require the use of special heavy installation equipment.

THE PRIOR ART

Over the many years, there has long existed the problem of land errosion adjacent waterways, rivers, lakes and oceans wherein seawalls of various types have heretofore been constructed of wood, steel or cement. Heretofore, efforts have been made to provide a series of seawall elements which are laterally aligned and in some manner interconnected and pounded down into the ground and anchored. Illustrative of earlier prior art efforts to provide a seawall, constructed of reinforced concrete, is U.S. Pat. No. 1,332,655 issued to R. B. Willard in 1920. The problem then as recognized by the inventor and thereafter, has been the enormous pressures and loads applied to the seawall which have ultimately destroyed the connection between adjacent seawall elements to render the seawall less than effective and ultimately requiring replacement and repairs.

SUMMARY OF THE INVENTION

An important feature of the present invention is to provide a seawall system which will insure shore protection in canal and river areas to withstand heat, cold, water pressure, shore pressure and constant water movement.

Another feature is to provide a seawall having a series of uniform laterally aligned elongated corrugated bulkhead strips made from a plastic material, and which are of such lightweight that each strip may be lifted and assembled manually into the ground and with respect to an adjacent strip and manually driven into the ground and into lateral alignment and longitudinal interlock with an adjacent strip.

Still another feature is that in the assembly of the corrugated bulkhead strips, molded from a plastic material, such as polyvinyl chloride (PVC), the weight of each strip is such that no heavy equipment of any nature is required for the installation of the seawall. On the other hand, it can be done by one, or at the most, two persons using currently available tools or by an installation company that does not have large equipment. For illustration, individual corrugated seawall strips can be installed down into the ground surface using an air compressor, a small water pump and hand tools that are readily available.

As a further feature the present seawall system is intended for use in waterways on installations which require bulkheads of less than 20 feet in overall length and which can be used as a replacement for all existing wood seawalls where the length thereof does not exceed 20 feet.

A further feature of the present seawall system is that the system can be installed and assembled in front of existing steel bulkheads that are leaking or were installed at lower water levels. The present bulkhead assembly can be installed in front of existing walls without significantly extending into the waterway.

A still further feature is that the present seawall system withstands pressure, ice, cold, pressure of backfill and can have a 50 plus year life. Off white or any light color of the molded plastic corrugated bulkhead strips may be used and such strips are more appealing than creosol colored wood or rusting iron. The seawall system is resistant to sunlight and saltwater and has no harmful effect upon the environment and primarily can be installed by the property owner.

Another important feature of the present invention is that the seawall assembly includes a series of laterally aligned elongated corrugated bulkhead strips made from a plastic material wherein the ratio of width to length is in the range between 1 and 10 to 1 and 21, so that individual bulkhead strips are so light that they may be manually handled and assembled and implanted by one or possibly two persons without the use of any installation equipment other than a mallet, or the use of an air compressor and a small water pump for providing such sufficient excavation of the adjacent ground surface. The individual corrugated bulkhead strip may be easily handled and manually assembled down into the ground and in laterally interlocked connection with the adjacent anchored strip.

A further feature contemplates the formation upon the corrugated strip along one side of an undercut groove edge and along its other side, a similarly shaped tongue edge, wherein the groove and tongue edges of adjacent bulkhead strips are snugly interlocked against lateral disassembly and wherein individual replacement may be made of worn or damaged corrugated strips.

As another feature, the present corrugated plastic bulkhead strips and the assembly thereof into a seawall can be done at an extremely low cost for the completed installation by an individual user. Once installed, the seawall height can be extended without major cost or outlay and wherein new corrugated bulkhead strips may be cemented or otherwise secured to the existing strips.

Another important feature includes the use of a cap made from a plastic material, generally of U-shape and which overlies and is adapted to retainingly engage the upper ends of a plurality of the corrugated seawall defining strips.

A further feature contemplates the use of an improved means for reinforcing and shoring up the seawall employing a plurality of tie rods and corrugated anchor strips embedded into the ground and a plurality of walers made from a plastic material.

These and other objects and features will be seen from the following Specification and claims in conjunction with the appended drawings.

IN THE DRAWINGS

FIG. 1 is a fragmentary riverside perspective view of the present seawall, fragmentarily shown.

FIG. 2 is a fragmentary vertical section thereof.

FIG. 3 is a front perspective view of one of the corrugated bulkhead strips, whose width in the drawing is considerably exaggerated with respect to the vertical height thereof.

FIG. 4 is a fragmentary section corresponding to FIG. 2, and on an increased scale, illustrating the cap and tie rod-waler reinforcing assembly of FIG. 2.

FIG. 5 is a plan view of the present corrugated bulkhead strip.

FIG. 6 is a plan view for a reversible elbow connector for use between adjacent seawall sections.

FIG. 7 is a similar view of the modified corrugated seawall section connector.

FIG. 8 is a plan view of a seawall length adjustment strip of a length corresponding to the seawall bulkhead strips.

FIG. 9 is a similar view of a pair of laterally interconnected seawall length adjustment strips and with one thereof connected to the outer tongue edge of an adjacent bulkhead strip, fragmentarily shown.

FIG. 10 is a plan view similar to FIG. 8 of a modified length adjustment strip for providing a gradual curve in a seawall adapted to be interposed between adjacent bulkhead strips or for use with respect to a similarly shaped length adjustment strip as in FIG. 9.

FIG. 11 is a fragmentary plan view, with parts broken away, of a modified bulkhead strip with the undercut groove edge and corresponding tongu edge provided with angular serrations.

FIG. 12 is a plan view of a length adjustment connector with angular serrations used with the bulkhead strip in FIG. 11.

FIG. 13 is a plan view of a further modified length adjustment strip with angular tongue and groove edges.

FIG. 14 is a fragmentary end view of a modified bulkhead strip with the corresponding undercut groove edge and similarly shaped tongue edge with angular tongue and groove edges corresponding to the length adjustment connector of FIG. 13.

FIG. 15 is a fragmentary end view, with parts broken away, of a further modified bulkhead strip having an undercut groove edge and tongue edge of E-shape configuration.

FIG. 16 is an end view of corresponding length adjustment connector used with the bulkhead strip illustrated in FIG. 15.

It will be understood that the above drawings illustrate merely preferred embodiments of the invention and that other embodiments are contemplated within the scope of the claims hereafter set forth.

DETAILED DESCRIPTION OF AN EMBODIMENT OF THE INVENTION

Referring to the drawings, FIGS. 1 through 5, the seawall 11 is adapted for use along a body of water and extends along and retainingly and protectively bears against a bounding shore. The seawall 11 at its top extends above the ground level, FIG. 2, and at its bottom is retainingly projected down into and anchored within the ground below the river or water bottom. The present seawall 11 consists of a series of laterally aligned elongated corrugated bulkhead strips 13 made from a lightweight plastic material, such as polyvinyl chloride (PVC).

In the illustrative embodiment, the bulkhead strip 13 is 0.250 inches thick, 9.250 inches wide, and 10 to 20 feet in length. The corrugated plastic molded bulkhead strips 13 are of such light weight that each strip 13 may be lifted and assembled manually relative to an adjacent strip 13 and driven into the ground and into lateral alignment and in longitudinal interlock with an adjacent strip 13.

Each bulkhead strip 13 includes along one side an undercut edge groove 15, which has a lateral opening slightly greater than the thickness of the bulkhead strip 13. Each strip 13 has along its other side a similarly shaped tongue edge 17 as shown in FIG. 3. In the preferred embodiment, the undercut groove ege 15 has a 30 degree elliptical shape or configuration. The longitudinal axis of the tongue edge 17 has a dimension of 0.5625 inches and the corresponding longitudinal axis of the undercut groove 15 has a dimension of 0.5925 inches. Each of the corrugated bulkhead strips 13 have a transverse top edge 19 and a transverse bottom edge 21.

The width of the bulkhead strip 13, exaggerated in FIG. 3, is 9.250 inches, whereas the height may range between 10 and 20 feet. Thus, there is a high ratio between the width of the individual corrugated bulkhead strip 13 and its length in the range of 1 to 10 to 1 to 20, for illustration. Thus, it appears that the individual corrugated bulkhead strips are of such lightweight that each strip 13 may be lifted and assembled manually by a single person without the use of any mechanical equipment.

In the illustrative embodiment, there are provided a plurality of laterally spaced elongated, corrugated anchor strips 23, preferably constructed of polyvinyl chloride, which are embedded in the ground at an acute angle to the seawall 11, as shown in FIG. 2. The respective spaced anchor strips 23, sometimes referred to as dead man strips, are inclined upwardly and outwardly with respect to the seawall 11 and are connected thereto by a series of tie rods 29 or tie backs as shown in FIGS. 2 and 4. The assembly of the respective horizontally disposed laterally spaced tie rods 29 with respect to the bulkhead strips 13 of the seawall 11 and the corresponding corrugated anchor strips 23 includes transversely extending walers 25, FIGS. 2 and 4. Each waler 25 is hollow, preferably rectangular in cross-section, flexible, and of a plastic material, such as PVC, and includes a bore 27.

Tie rod 29 has threaded ends 33 and 31, FIG. 2, which extend through the corresponding anchor strip 23 and the opposed adjacent bulkhead strip 13 and outwardly thereof. The walers 25 are mounted on opposite ends of rod 29 and secured thereto by the flat washers 35 and nuts 37, FIGS. 2 and 4. The walers 25 are resilient and provide an effective efficient means of transferring and distributing the forces applied to the seawall 11 from an individual corrugated strip 13 or plurality thereof, back to corresponding opposed anchor strips 23. Rubber grommets 39 are provided on the ends 33 of the tie rods 29 as shown in FIG. 2 to provide a seal between the tie rods 29 and the anchor strips 23. Resilient or rubber gaskets 36 are provided around the threaded ends 31 of rods 29 between the walers 25 and the bulkhead strips 13 to provide water tight seals to prevent water from entering through the openings in the strips 30 for the rods 29.

In the illustrative embodiment, the anchor strips 23 are laterally displaced from each other at center distances of six feet, and suitably embedded within the ground, as in FIG. 2.

In many situations where the distance of the seawall 11 above the water level is considerable, a second set of laterally spaced tie rods 29 are employed, vertically aligned with corresponding tie rods 29. These are projected through corresponding portions of the adjacent anchor strip 23 and the opposed bulkhead strip 13, for further reinforcement of the seawall 11 along its length. The corresponding fasteners or nuts 37 are tightened with respect to the adjacent walers 25 under a limited compression.

Overlying a plurality of laterally interconnected corrugated bulkhead strips 13 is a channel cap 41, of a plastic material, preferably polyvinyl chloride. The cap 41 may be made of a series of longitudinally aligned engaging cap sections, as shown in FIG. 1. Cap 41 has a convex or rounded top 43 to prevent the accumulation of water thereon.

Upon the sides of the cap 41 adjacent the top 43 are opposed continuous beads 45 forming an integral part of the cap. At least one such bead 45 is employed and is effective in reacting to wave action and for diverting waves action back towards the water. Cap 41, or a series of aligned cap sections, are anchored or adhesively connected as at 47, FIG. 4, to the upper ends of the laterally aligned interconnected corrugated bulkhead strips 13. Any suitable plastic adhesive may be employed.

As an alternative and to facilitate removal of the cap 41 or cap sections for replacement of an individual damaged bulkhead strip 13, there may be employed, as in FIG. 4, a plurality of laterally spaced bolts 49 of a plastic material, such as Nylon (Trademark). Alternately, the bolts 49 may be employed in addition to the adhesive 47. A suitable sealer 51 is applied upon the interior of the waler 25 and adjacent the apertures therethrough and with respect to the bulkhead strips 13 to prevent the seepage of water through the seawall 11.

In the illustrative embodiment and for a better understanding of the size and lightweight construction of the present bulkhead strips 13, the overall lateral dimension of the corrugations of the strip are shown at 53, FIG. 3, as being 1.250 inches. As one means by which the individual corrugated bulkhead strip 13 is advanced downwardly into the ground surface with or wihout the use of water pressure, there may be employed an inverted U shaped metal strip having an interior width channel slightly greater than dimension 53, so that a hammer or mallet can apply longitudinal downward pressure to the corresponding bulkhead strip 13 without damaging such strip 13.

Corrugated corner connector strip or elbow 55 is shown in FIG. 7, is reversible in use. The angularly related portions or legs 52 and 54 of the elbow 55 are arranged at 90 degrees, as in FIG. 7, but which selectively may be arranged at 45, 30 or 22 degrees, for illustration. Elbow 55 is of a height corresponding to the height or length of the corrugated bulkhead strip 13 and has along one side an undercut groove edge 15 and along its other side a similarly shaped tongue edge 17, corresponding to the undercut groove edge and tongue edge for the corrugated strip 13, FIG. 5. This provides a means by which the seawall 11 may be constructed with more than one section or portion and wherein the sections are arranged at angles to each other and spaced apart. There may be interposed between adjacent angularly related sections, a corrugated connector elbow 55, whose corresponding undercut groove edge 15 and similarly shaped tongue edge 17 will be assembled with respect to the adjacent outer corresponding groove and tongue edges of adjacent bulkhead strips 13 of the seawall.

A modified curved section connecting elbow 57 is shown in FIG. 6, wherein the corresponding side edges have elongated undercut groove edge 15 and the corresponding tongue edge 17, providing for easy longitudinal interlock and connection between adjacent edge portions of angularly related seawall portions or sections. The corresponding legs of the curved elbow connector 57 could be at different angles, the same as the corresponding legs 52 and 54 of elbow 55, FIG. 7. Each of the corner elbows 55 and 57 are constructed of a plastic material, preferably polyvinyl chloride.

A wall length extension strip 59 is shown in FIG. 8 and is made from polyvinyl chloride. Strip 59 is normally of a width less than the width of a corresponding bulkhead strip 13. The length of extension strip 59 is the same as the corresponding bulkhead strip 13 and has along one side an undercut groove edge 15 and along its other side a similarly shaped tongue edge 17.

In situations where it is necessary to modify the length of the seawall 11 by a dimension which is less than the width of an individual bulkhead strip 13, there may be employed one or more of the wall length extension strips 59. These are reversible, as shown in FIG. 9, wherein a pair of wall length extension strips 59 are interconnected by the corresponding cooperating interlocked bulkhead groove edge 15 and tongue edge 17. Thus, one or more of the wall length extension strips 59, may be used for modifying or regulating the seawall length to correspond to a particular geographic shore location.

A modified wall length extension strip 61, constructed of polyvinyl chloride, is of the same length as wall length extension strip 59 and is of the same construction, except that the undercut groove edge 15 extends at an acute angle of approximately 11.250 degrees with respect to the body of the wall length extension strip 61. The groove edge 15 of FIG. 10 has an axis 63 at the aforesaid angle. This provides for internal or external gradual turns along the length of the seawall 11 as shown in FIG. 1. One or more interconnected wall length extension strips 61 may be used, in the same manner as shown in FIG. 9, for accomplishing a particular curve within a seawall 11. The corresponding opposed groove edge 15 and tongue edge 17 is interposed between adjacent laterally spaced bulkhead strips 13 and interconnected therewith by a longitudinal interlock.

A modified corrugated bulkhead strip 65 is shown, partly broken away and in plan, in FIG. 11, having on one side an elongated undercut groove edge 67 having a series of internal angular serrations 69. Along the opposite side of the bulkhead strip 65 there is provided a similarly shaped tongue edge 71 having a corresponding series of external angular serrations 72.

A modified wall length extension strip 73 is shown in FIG. 12, and is adapted for use in interconnecting a pair of spaced adjacent bulkhead strips 65. Here the corresponding opposite longitudinal edges have thereon an undercut groove edge 67 with internal angular serrations 69 and upon its opposite side a similarly shaped tongue edge 71. The wall length extension strip 73 of FIG. 12, strip 83 of FIG. 13 and strip 92 of FIG. 16 are each of the same length as the adjacent bulkhead strip to which it is connected.

A modified corrugated bulkhead strip 75 also made of a plastic material such as PVC, is shown in FIG. 14. The strip 75 has along one side an elongated undercut groove edge 77 having an internal angular notch 79. Upon the opposite side of the bulkhead strip 75 there is provided a similarly shaped angular tongue edge 81.

The corresponding tongue and groove edges 79 and 81 of the modified corrugated bulkhead strip 75 are adapted for interlocking retaining engagement within the corresponding edges of adjacent bulkhead strips 75. The assembly of the seawall is the same as previously described. For use in conjunction with the modified bulkhead strip 75 there is shown in FIG. 13 a modified wall extension strip 83. One side strip 75 has an undercut groove edge 77 whose internal angular notch 79 corresponds to and is adapted to receive the corresponding angular tongue edge 81 of an adjacent bulkhead strip 75. The modified seawall extension strip 83 has upon its opposite side an elongated angular tongue edge 81 adapted for cooperative securing registry within the corresponding undercut groove edge 77 of an adjacent bulkhead strip 75.

A further modified corrugated heavy duty bulkhead strip 85 is fragmentarily shown in FIG. 15. The strip 85 has along one side an undercut groove edge 87 having an internal E-shaped slot 89. Upon and along the opposite side of the bulkhead strip 85, there is provided a correspondingly shaped tongue edge 91, of E-shape configuration. The modified seawall extension strip 92 shown in FIG. 16, is similarly shaped. Its elongated undercut groove edge 87 89 and tongue edge 91 are adapted for use in conjunction with the heavy duty bulkhead strip 85.

Having described my invention reference should now be had to the following claims:

I claim:

1. In a seawall along a body of water, extending along and retainingly and protectively bearing against a bounding shore with the seawall at its top extending above the ground level and at its bottom, retainingly projected down into the ground below the water bottom, the seawall comprising a series of laterally aligned enlongated corrugated bulkhead strips;

each bulkhead strip having along one side an undercut groove edge and along its other side, a similarly shaped tongue edge;

with the groove edges and tongue edges of adjacent bulkhead strips snugly interlocked;

the strips being made from a plastic material such that each strip may be lifted and assembled manually relative to an adjacent strip and driven into the ground into lateral alignment and longitudinal interlock with an adjacent strip;

a plurality of laterally spaced upright anchor strips inclined upwardly and away from said assembled bulkhead strips and embedded into the ground;

a series of flexible whalers spanning laterally across the face of said bulkhead strips adjacent said body of water, each of said whalers abutting an adjacent whaler in longitudinal alignment; and a plurality of laterally spaced tie means protruding through said whalers interconnecting said bulkhead strips and said anchor strips, said whalers transferring and distributing the forces applied to said seawall along the surface of said bulkhead strips.

2. In the seawall of claim 1, the ratio of the width of each bulkhead strip to its length being in the range of between 1 to 10 and 1 to 21.

3. In the seawall of claim 1, the ratio of the width of each bulkhead strip to its length being 1 to 16, approximately.

4. In the seawall of claim 1, a hollow flexible waler of plastic material receiving the inner end of each tie means retainingly bearing against and extending laterally across a portion of the width of each anchor strip.

5. In the seawall of claim 1, a plurality of laterally spaced second tie means vertically aligned with said first tie means, and at their opposite ends projected through said anchor strips and opposed bulkhead strips respectively and secured thereto.

6. In the seawall of claim 1 said bulkhead strips, cap and walers being made from polyvinyl chloride.

7. In the seawall of claim 1, a plastic adhesive interposed between said cap and bulkhead strips.

8. In the seawall of claim 1, a plurality of laterally spaced plastic bolts extending transversely through said cap and through adjacent top portions of said bulkhead strips and secured thereto in compression.

9. In the seawall of claim 1, said seawall including first and second seawall portions, said second seawall portion being spaced from and extending at an angle to the first portion; and a corrugated elbow strip connector having angularly related sections, one section having along its side an undercut groove edge and the other section having along its side a similarly shaped tongue edge, with its groove and tongue edges assembled over and interlocked with the outer tongue and groove edges respectively of said first and second seawall portions.

10. In the seawall of claim 9, the angle between said seawall portions being between 90 and 180 degrees, approximately, and the angle between the sections of said elbow strip connector being at a similar angle, substantially.

11. In the seawall of claim 9, said elbow strip connector being curved in plan.

12. In the seawall of claim 1, an elongated wall length adjustment strip made of a plastic material and of less width than and interposed between and in lateral alignment with adjacent bulkhead strips, each length adjustment strip having along one side, an undercut groove edge and along its underside a similarly shaped tongue edge, with said groove and tongue edges respectively, laterally interlocked with the corresponding tongue and groove edges of adjacent bulkhead strips.

13. In the seawall of claim 12, the undercut groove edge of said length adjustment strip extending from said strip at an angle of 11 degrees, approximately, providing for selective internal and external turns in said seawall.

14. In the seawall of claim 1, a pair of elongated length adjustment strips made of plastic material, each strip being of less width than said bulkhead strips, each length adjustment strip having along one side an undercut groove edge and along its other side a similarly shaped tongue edge;

with the adjacent tongue and groove edges of said length adjustment strips laterally interconnected; and with the corresponding outer groove and tongue edges of the interconnected length adjustment strips being laterally interlocked with the corresponding tongue and groove edges of adjacent bulkhead strips.

15. In the seawall of claim 1, the groove in said undercut groove edge and said tongue edge being of elliptical shape, for a positive longitudinal connection and lateral interlock between bulkhead strips.

16. In the seawall of claim 1, the groove in said undercut groove edge and said tongue edge having a series of angular interlocking serrations for a positive longitudinal connection and lateral interlock between bulkhead strips.

17. In the seawall of claim 12, the groove in said undercut groove edges and said tongue edges each having a series of angular interlocking serrations for a positive longitudinal connection and lateral interlock between said bulkhead strips and between said length adjustment strip and adjacent bulkhead strips.

18. In the seawall of claim 1, the groove in said undercut groove edge and the tongue edge being of E-shape for a positive longitudinal connection and lateral interlock between bulkhead strips.

19. In the seawall of claim 12, the groove in said undercut groove edges and said tongue edges being of E-shape for a positive longitudinal connection and lateral interlock between adjacent bulkhead strips and between said length adjustment strip and adjacent bulkhead strips.

20. In the seawall of claim 1, the groove in said groove edge and said tongue edge being of irregular angular shape for a positive longitudinal connection and lateral interlock between adjacent bulkhead strips.

21. In the seawall of claim 12, the groove in said groove edge and said tongue edge being of irregular angular shape for a positive longitudinal connection and lateral interlock between adjacent bulkhead strips and between said length adjustment strip and adjacent bulkhead strips.

22. In the seawall of claim 1, further comprising a cap of inverted U-shape, said cap being snugly assembled over and retainingly engaging the upper ends of said strips;

said cap including a transversely convex top and at least one side adjacent said top having an outwardly directed convex water deflecting bead.

23. In a seawall along a body of water, extending along and retainingly and protectively bearing against a bounding shore with the seawall at its top extending above the ground level and at its bottom, retainingly projected down into the ground below the water bottom, the seawall comprising:

a series of laterally aligned elongated corrugated bulkhead strips with each bulkhead strip having along one side an undercut groove edge and along its other side, a similarly-shaped tongue edge with the groove edges and tongue edges of adjacent strips snugly interlocked;

the strips being made from a plastic material such that each strip may be lifted and assembled manually relative to an adjacent strip and driven into the ground in lateral alignment and longitudinal interlock with an adjacent strip;

each bulkhead strip being substantially greater in length than in width and having a generally sinusoidal corrugation extending across the width of the strip perpendicular to the length, the corrugation extending between the groove and the tongue edge increasing the overall lateral dimension of the strip;

the groove edge and tongue edge being positioned such that when adjacent edges are interconnected, the overall lateral dimension of the strip remains generally uniform and the sinusoidal corrugations are generally are uninterrupted providing strength to the seawall.

24. In the seawall of claim 23, the ratio of the width of each bulkhead strip to its length being in the range of between 1 to 10 and 1 to 21.

25. In the seawall of claim 23, the ratio of the width of each bulkhead strip to its length being 1 to 16, approximately.

26. In the seawall of claim 23, the seawall including first and second seawall portions, the second seawall portion being spaced from and extending at an angle to the first portion; and a corrugated elbow strip connector having angularly related sections, one section having along its side an undercut groove edge and the other section having along its side a similarly shaped tongue edge, with its groove and tongue edges assembled over and interlocked with the outer tongue and groove edges respectively of the first and second seawall portions.

27. In the seawall of claim 26, said elbow strip connector being curved in plan.

28. In the seawall of claim 23, an elongated wall length adjustment strip made of a plastic material and of less width than and interposed between and in lateral alignment with adjacent bulkhead strips, each length adjustment strip having along one side, an undercut groove edge and along its other side a similarly shaped tongue edge, with the groove and tongue edges respectively, laterally interlocked with the corresponding tongue and groove edges of adjacent bulkhead strips.

29. In the seawall of claim 28, the undercut groove edge of the length adjustment strip extending from the strip at an angle of 11 degrees, approximately, providing for selective internal and external turns in the seawall.

* * * * *